Oct. 19, 1965 J. W. PHILLIPS 3,212,352

RATIO ADJUSTER ASSEMBLY

Filed Sept. 10, 1962 2 Sheets-Sheet 1

FIG. I.

INVENTOR
James W. Phillips

BY Herbert M. Birch

ATTORNEY

Oct. 19, 1965 J. W. PHILLIPS 3,212,352

RATIO ADJUSTER ASSEMBLY

Filed Sept. 10, 1962 2 Sheets-Sheet 2

INVENTOR
James W. Phillips

BY [signature]

ATTORNEY

United States Patent Office 3,212,352

Patented Oct. 19, 1965

3,212,352

RATIO ADJUSTER ASSEMBLY

James W. Phillips, South Bend, Ind., assignor to Robertshaw Controls Company, a corporation of Delaware Filed Sept. 10, 1962, Ser. No. 222,419

5 Claims. (Cl. 74—522)

The present invention relates generally to linkage means and more particularly to linkage means adapted to change oscillating motion to reciprocating motion, including means for adjustment of the ratio between the two motions.

There are many needs for an improved ratio adjuster assembly unit, such as to be hereinafter described and particularly wherein the unit is an improvement over prior art devices both in performance and in the simplicity and ease of fabricating the same.

Accordingly an object of this invention is to provide an improved ratio adjuster assembly having simplicity and ease of fabrication.

Another object is to provide a durable ratio adjuster assembly which is very efficient in operation.

A further object is to provide a positive acting ratio adjuster assembly with means to eliminate lost motion in the ratio adjustment.

Still another object is to provide a novel screw adjustment and spring lock means for the adjusting screw of the unit.

Yet another object is to provide a ratio adjuster assembly having a minimum of working parts adapted to be easily assembled for efficient operating with any suitable indicating recording or controlling apparatus.

Other objects and advantages of the invention will become apparent from the following description taken with reference to the accompanying drawing.

Figure 1:
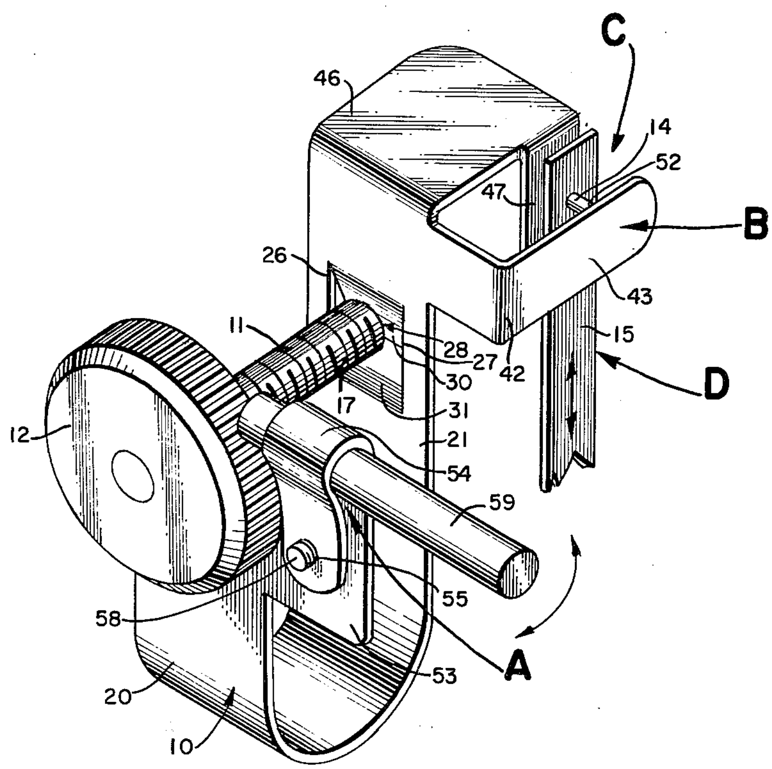
FIGURE 1 illustrates an assembled embodiment of the present invention is an enlarged perspective, showing the same mounted on the shaft of any suitable apparatus with which the same is to be connected.
Figure 2:
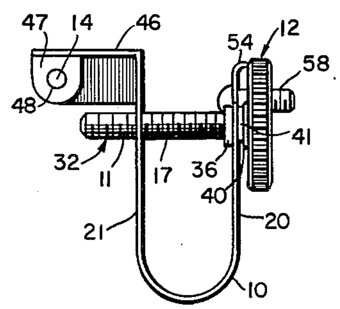
FIGURE 2 is a side elevation view of the enlarged assembled embodiment.
Figure 3:
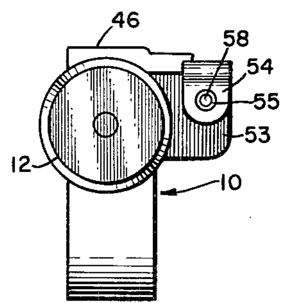
FIGURE 3 is a front elevation view of FIGURE 2.
Figure 4:
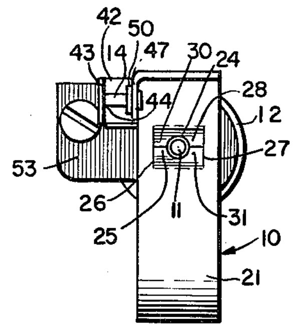
FIGURE 4 is a rear elevation view of FIGURE 2.
Figure 5:
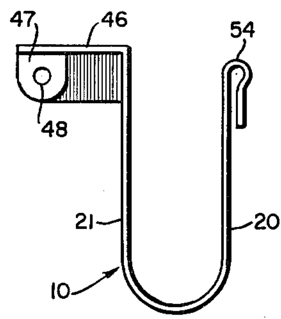
FIGURE 5 is a side elevation view of the U-shaped adjustment spring apart from the assembled views.
Figure 6:
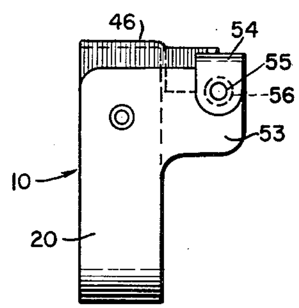
FIGURE 6 is a front elevation view of the spring.
Figure 7:
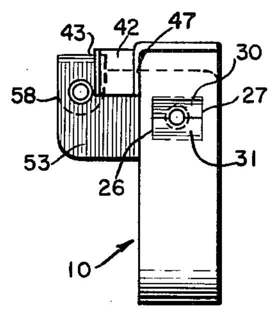
FIGURE 7 is a rear elevation view of the spring of FIGURE 6.
Figure 8:
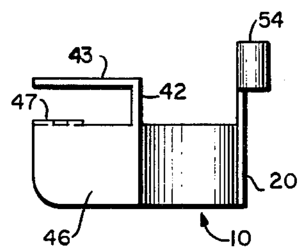
FIGURE 8 is a top plan view of the spring.

Referring in detail to the invention and first with particular reference to the assembled views illustrated in FIGURES 1, 2, 3 and 4, the unit broadly comprises a U-shaped adjustment spring 10, an adjusting screw 11, a hand knob 12 secured suitably to the end 13 of said adjusting screw 11, a pivot pin 14 on which the adjusting spring 10 is oscillatable, and a take-off linear link 15 is mounted to reciprocate. The shank 17 of the adjusting screw positions the legs of the U-shaped adjustment spring 10.

Each of the foregoing elements of the above ratio adjuster assembly is novelly constructed to provide the highly efficient ratio adjustments attainable with the present novel assembly. For example, the legs 20 and 21 of the novel U-shaped adjustment spring 10 are of specific structure. The leg 20 is formed with an opening adjacent the upper end, the walls of which serve as a bearing for the head end 23 of the shank 17 of the screw shaft 11, while the opposite leg 21 is formed directly opposite and at the same horizontal plane to the opening with an opening 24, see FIGURE 4. The opening 24 is centrally positioned on the bridge line cut 25 of the cut lines 26 and 27 of an H-shaped cut out in the provision of a push-nut 28, see FIGURE 4. The push-nut provides a spring lock for the screw shaft 11 by the yieldable spring action of the tabs 30 and 31 of the push-nut 28 in coaction with the shank of the said shaft.

Figure 9:
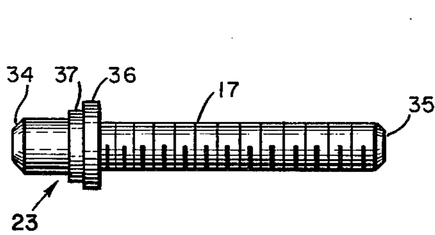
FIGURE 9 is a detail view of the knob screw shaft of the unit.

The screw shaft 11 is shown in detail in FIGURE 9 and comprises the threaded shank 17 between its fore and aft ends 34 and 35, respectively. Formed on the fore end 34 of the shaft is a flange cluster formed of a thrust flange 36 and a relatively smaller bearing flange 37. The thrust flange 36 seats against the inner side of the leg 20 at the opening therein and the bearing flange 37 is turnable in the opening and serves as a stop when the hand knob 12 is forced over the head or fore end 34 of the adjustment screw 11, said knob having a bushing 40 formed on its inner face to friction fit on said head 34. If desired a set screw 41 may be provided in the bushing to lock the knob onto the screw shaft head.

Figure 10:
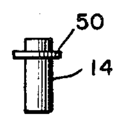
FIGURE 10 is a detail view of a pivot pin for connection to the linear take-off member of the unit.

The opposite leg 21 of the adjustment spring 10 is integrally formed with a laterally protecting and rearwardly directed lug 42. The lug 42 adjacent its rearwardly directed free end 43 engages the end of the pivot pin 14. Also, the leg 21 is bent rearwardly at the top in the provision of a support plate 46 from one side edge of which depends a second lug 47 to a position adjacent the first lateral lug 43. This second lug 47 is formed with an aligned pivot opening 48 to the opening 44 in the first lug 43, whereby the pin 14, shown in detail in FIGURE 10, is mounted between the respectively spaced lugs to pivotally anchor one end of the linear take-off member or reciprocatable link 15, see FIGURE 1. The head of the pivot pin 14 is formed with an integral washer or thrust flange 50, see FIGURE 10. The flange 50 seats against the outer surface of the second lug 47 adjacent the pivot opening 48 therein and engages the adjacent side of the link 15, which is likewise formed at an aligned position with a similar pivot opening 52, see FIGURE 1. The opposite end of the pivot pin 14 terminates against the inner side surface of the first lug 43.

The opposite leg 20 of the U-shaped adjustment spring 10 is formed with a laterally extending plate 53, which includes an integral securing strap 54, see FIGURE 1. This strap 54 is flexible and formed in the end with a threaded opening 55 for alignment with a similar opening 56 in the plate 53 to receive a securing means, such as a bolt 58. The strap 54 is adapted to be secured to the shaft 59 of any suitable apparatus, not shown, with which the assembled unit is to be used and to which the linear shaft or link 15 is to be operatively associated with, see FIGURE 1.

*Operation*

The operation of the assembled unit is very simple, and referring to FIGURE 1 and the reference letters A, B, C and D, the Ratio Adjuster Assembly is connected to the shaft 50 of any suitable apparatus at point A. Oscillation of the unit is in a limited arc moving point B or pivot 14 along arc BC and when oscillation of the shaft 59 causes point B to move along arc BC, linear or reciprocating motion is transmitted to link 15.

Thus ratio adjustment is accomplished by turning knob 12 clockwise or counter-clockwise, thereby changing the distance between points A and B, which thereby changes the distance of the reciprocating movement of the linear take-off link 15 in response to a given number of degrees of oscillation of the shaft 50.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. Means for changing oscillating motion to reciprocating motion comprising means to adjust the ratio between the said oscillating and reciprocating motions, said means including an oscillatably mounted adjusting spring and a reciprocatably movable shaft pivoted to said spring, an adjusting shaft means for adjusting said spring, and a spring lock for said adjusting shaft.

2. Means for changing oscillating motion to reciprocating motion comprising means to adjust the ratio between the said oscillating and reciprocating motions, said means including an oscillatably mounted adjusting spring and a reciprocatably movable shaft pivoted to said spring, an adjusting screw shaft for adjusting the ratio of said spring, and a spring lock for said adjusting means, said adjusting spring being U-shaped in the provision of spaced legs.

3. Means for changing oscillating motion to reciprocating motion comprising means to adjust the ratio between the said oscillating and reciprocating motions, said means including an oscillatably mounted adjusting spring and a reciprocatably movable shaft pivoted to said spring, an adjusting shaft with an elongated shank for adjusting said spring, and a spring lock for said adjusting shaft, said adjusting spring being U-shaped in the provision of spaced legs, one of said legs of the adjusting spring being formed adjacent the top edge with an integral laterally projecting and rearwardly directed lug, said lug being pivoted to said reciprocatable shaft.

4. Means for changing oscillating motion to reciprocating motion comprising means to adjust the ratio between the said oscillating and reciprocating motions, said means including an oscillatably mounted adjusting spring and a reciprocatably movable shaft pivoted to said spring, an adjusting means for adjusting said spring, said adjusting spring being U-shaped with spaced legs and a screw adjusting shaft having a shank and a flange cluster adjacent one end thereof, a hand knob mounted on the end of said shank for turning said shaft to vary the space between the legs of the adjusting spring, a lug carried by one of said legs, said leg having a top support plate, a second lug depending from a side of said plate and adjacent said first lug, a pivot pin mounted between said lugs in aligned openings therein, said pin pivotally supporting said shaft, whereby the oscillating motion of said adjusting spring is transmitted to said shaft and changed to reciprocating motion.

5. Means for changing oscillating motion to reciprocating motion comprising means to adjust the ratio between the said oscillating and reciprocating motions, said means including an oscillatably mounted adjusting spring and a reciprocatably movable shaft pivoted to said spring, an adjusting screw shaft for adjusting the ratio of said spring, and a spring lock for said adjusting screw shaft, said adjusting spring being U-shaped in the provision of spaced legs, said adjusting screw shaft and said spring lock means comprising a push-nut device for engagement with the shank of said adjusting screw shaft.

References Cited by the Examiner

UNITED STATES PATENTS

| | | | |
|---|---|---|---|
| 2,324,666 | 7/43 | Augst | 74—522 XR |
| 2,358,890 | 9/44 | Tinnerman | 85—36 |
| 2,397,251 | 3/46 | Eggert | 85—36 |
| 2,997,888 | 8/61 | Rust | 74—522 XR |
| 3,037,731 | 6/62 | Licklider et al. | 85—36 |
| 3,090,399 | 5/63 | Godshalk | 74—522 XR |

BROUGHTON G. DURHAM, *Primary Examiner.*